(12) United States Patent
Lerner et al.

(10) Patent No.: US 8,308,133 B1
(45) Date of Patent: Nov. 13, 2012

(54) FREEZE CAPABLE ANODE VALVE WITH A HOUSED SLIDING PLATE ORIFICE

(75) Inventors: Seth E. Lerner, Honeoye Falls, NY (US); Aaron Rogahn, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/164,020

(22) Filed: Jun. 20, 2011

(51) Int. Cl.
*F16K 3/00* (2006.01)

(52) U.S. Cl. ........................................ 251/326; 429/512

(58) Field of Classification Search .................. 137/613, 137/614.13, 614.14, 614.19, 641.21; 251/174, 251/176, 179, 180, 193, 326, 327, 328, 329
See application file for complete search history.

(56) References Cited

U.S. PATENT DOCUMENTS

| | | | |
|---|---|---|---|
| 6,439,539 B1 * | 8/2002 | Powell | 251/87 |
| 2008/0107930 A1 * | 5/2008 | Eickhoff et al. | 429/13 |
| 2009/0208795 A1 | 8/2009 | Skala et al. | |

* cited by examiner

*Primary Examiner* — Ula C Ruddock
*Assistant Examiner* — Scott J Chmielecki
(74) *Attorney, Agent, or Firm* — Fraser Clemens Martin & Miller LLC; J. Douglas Miller

(57) ABSTRACT

A valve for a fuel cell system includes a main body having a passage through which a fluid is permitted to flow. A sliding member is disposed in the main body and configured to move between an open position and a closed position. The sliding member has an orifice formed therein. At least one biased plug is disposed within the main body adjacent the sliding member. The biased plug abuts an outer surface of the sliding member and permits fluid flow through the orifice of the sliding member when the sliding member is in the open position. The biased plug seals the orifice of the sliding member and militates against a formation of ice in the orifice when the sliding member is in the closed position.

20 Claims, 4 Drawing Sheets

FREEZE CAPABLE ANODE VALVE WITH A HOUSED SLIDING PLATE ORIFICE

FIELD OF THE INVENTION

The disclosure relates to an anode valve and, more particularly, to an anode valve for a fuel cell system.

BACKGROUND OF THE INVENTION

A fuel cell system is an electro-chemical device that includes an anode and a cathode with an electrolyte therebetween. The anode receives a fuel such as hydrogen and the cathode receives an oxidant such as oxygen or air. When the fuel is supplied to a reaction plane of the anode via an anode loop, the fuel is ionized and the fuel ions are transferred to the cathode via a solid polymer electrolyte membrane. During this process, electrons are generated and flow to an external circuit, providing direct current electric energy. As the oxidant is supplied to the cathode via a cathode loop, the fuel ions, electrons, and the oxidant react at the cathode and produce water. The water is exhausted from the fuel cell system by means of a cathode exhaust passage. Typically, not all of the water is exhausted from the fuel cell system. An exemplary fuel cell system is shown and described in Assignee's co-pending U.S. Pat. Appl. Pub. No. 2009/0208795 to Skala et al., the entire disclosure of which is hereby incorporated herein by reference.

Valves are typically disposed in the anode loop to control various flows and parameters of the fuel such as a pressure and a temperature of the fuel within the fuel cell system, for example. One such anode valve controls a flow of the fuel to the cathode for warm-up of the fuel cell system in a low-temperature environment. If water remains in the anode loop after fuel cell system shutoff, and the fuel cell system is maintained in the low-temperature environment, the water remaining in the anode valve may freeze and form ice. The ice may form a blockage in the anode valve and prevent normal operation of the anode valve. When the anode valve is not operating normally, it may be difficult to restart the fuel cell system, which is undesirable.

There is a continuing need for an anode valve for a fuel cell system that militates against ice formation and blockage. Desirably, the anode valve is sealed to militate against ice buildup during fuel cell system shutoff.

SUMMARY OF THE INVENTION

In concordance with the instant disclosure, a valve for a fuel cell system that militates against ice formation and blockage, and which is sealed to militate against ice buildup during fuel cell system shutoff, is surprisingly discovered.

The prevent invention includes a valve body with a solenoid actuator. The actuator is connected to a thin plate with an orifice hole. A compliant seal is bonded to the plate and the valve body to separate an inlet channel from an outlet channel of the valve body. The seal is able to flex to accommodate a linear motion of the plate. When the plate is in a closed position, a pair of spring loaded plugs fit into an orifice in the plate from above and below the plate. This creates a seal to close the valve and prevents ice formation in the orifice. The orifice also has a chamfer on both sides such that, when the plate is in an open position, a thrust force generated on the spring loaded plug seals will compress the springs and allow the plate to slide out, and expose the orifice to allow for flow. The high pressure side of the orifice will act to create a positive seal when the plate is in the closed position.

In one embodiment, a valve for a fuel cell system includes a main body having a passage through which a fluid is permitted to flow. A sliding member is disposed in the main body and configured to move between an open position and a closed position. The sliding member has an orifice formed therein. At least one biased plug is disposed within the main body adjacent the sliding member. The biased plug abuts an outer surface of the sliding member and permits fluid flow through the orifice of the sliding member when the sliding member is in the open position. The biased plug seals the orifice of the sliding member and militates against a formation of ice in the orifice when the sliding member is in the closed position.

In another embodiment, a valve for a fuel cell system includes a main body having a passage through which a fluid is permitted to flow. A sliding member is disposed in the main body and configured to move between an open position and a closed position, the sliding member having an orifice formed therein. A first biased plug is disposed within the main body adjacent the sliding member. The biased plug abuts a first outer surface of the sliding member and permits fluid flow through the orifice of the sliding member when the sliding member is in the open position. The first biased plug seals the orifice of the sliding member and militates against a formation of ice in the orifice when the sliding member is in the closed position. A second biased plug is disposed within the main body adjacent the sliding member. The second biased plug is disposed opposite the first biased plug. The second biased plug abuts a second outer surface of the sliding member and permits fluid flow through the orifice of the sliding member when the sliding member is in the open position. The second biased plug seals the orifice of the sliding member and militates against a formation of ice in the orifice when the sliding member is in the closed position.

BRIEF DESCRIPTION OF THE DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
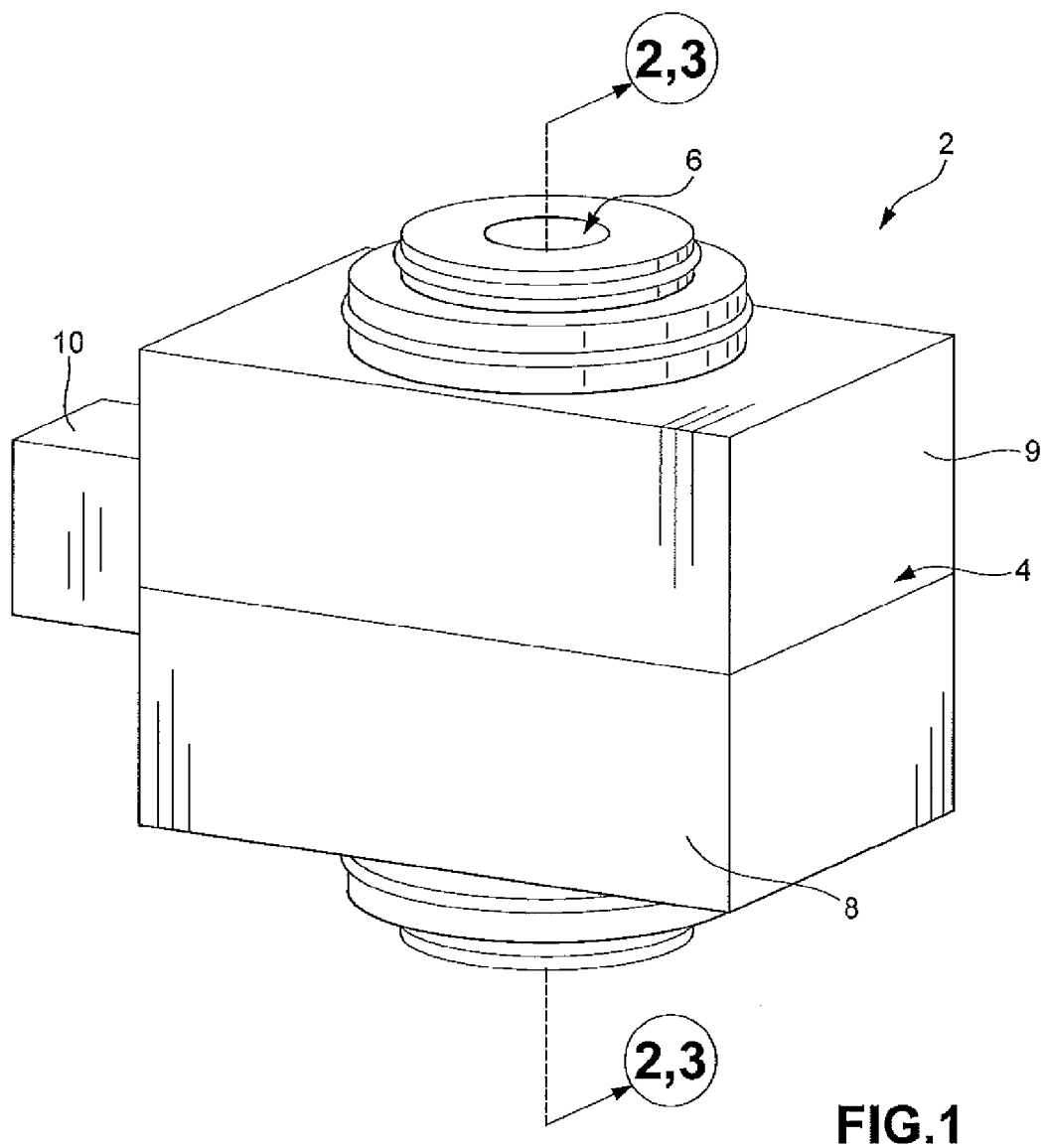
FIG. 1 is a perspective view of an exemplary valve according to an embodiment of the present disclosure.

In FIG. 1, a valve 2 for a fuel cell system (not shown) is illustrated. As a nonlimiting example, the valve 2 may be an anode valve in fluid communication with an anode inlet of the fuel cell system. In another example, the valve 2 may be a cathode valve in fluid communication with a cathode inlet of the fuel cell system. The valve 2 may advantageously militate against a formation and buildup of ice in the valve 2 during a shutdown of the fuel cell system. The valve 2 may also be used at other locations within the fuel cell system, within the scope of the present disclosure.

The valve 2 has a main body 4 with a passage 6 through which a fluid such as a fuel or an oxidant is permitted to flow during an operation of the valve 2. The main body 4 may be formed as a single unitary piece, or from more than one piece, as desired. For example, as shown in FIG. 1, the main body 4 may be formed from a first portion 8 and a second portion 9. The valve 2 also includes an actuator 10. The actuator 10 is operatively coupled to the main body 4 for opening and closing the valve 2. The actuator 10 may be a linear actuator, for example. In a particular embodiment, the actuator 10 is a solenoid. A skilled artisan may select other types of actuators 10 for operating the valve 2, as desired.

Figure 2:
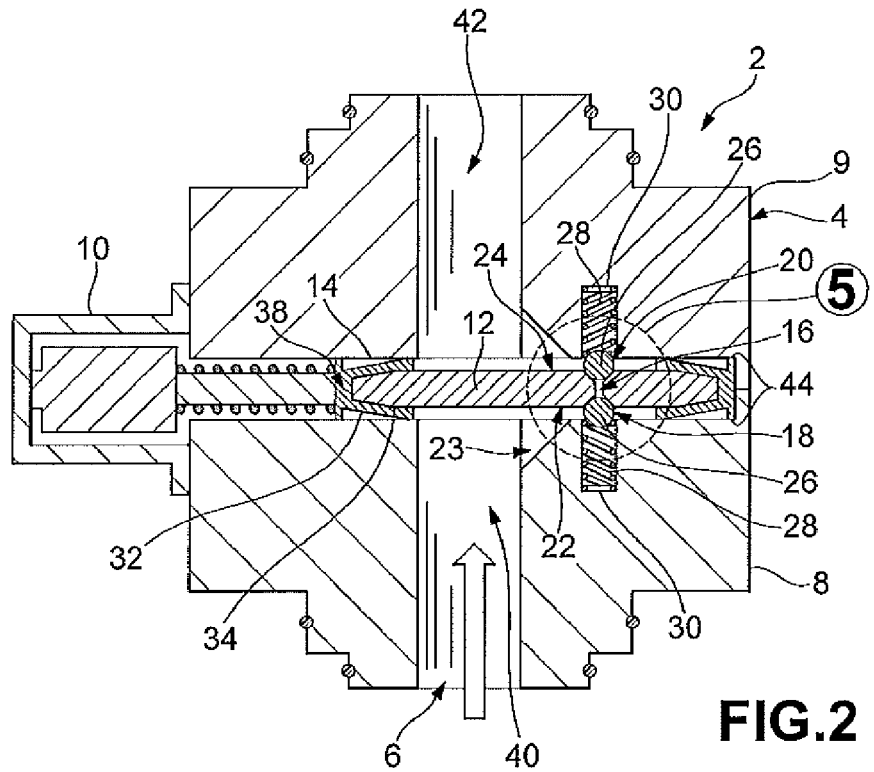
FIG. 2 is a cross-sectional side elevational view of the valve taken along section line 2,3-2,3 in FIG. 1, and showing the valve in a closed position.
Figure 3:
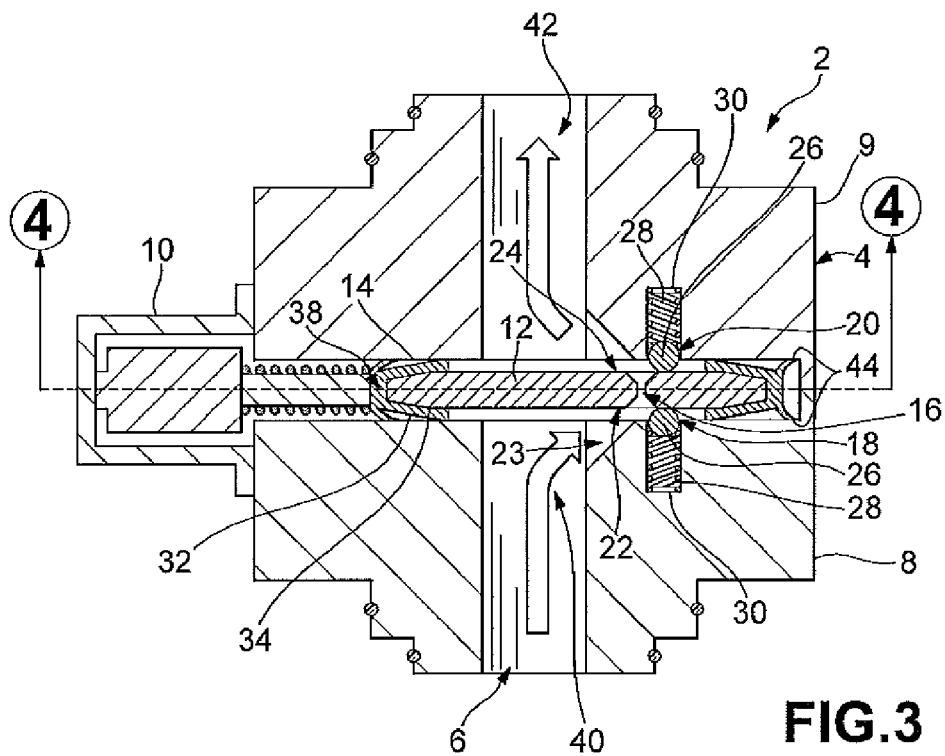
FIG. 3 is a cross-sectional side elevational view of the valve taken along section line 2,3-2,3 in FIG. 1, and showing the valve in an open position.
Figure 4:
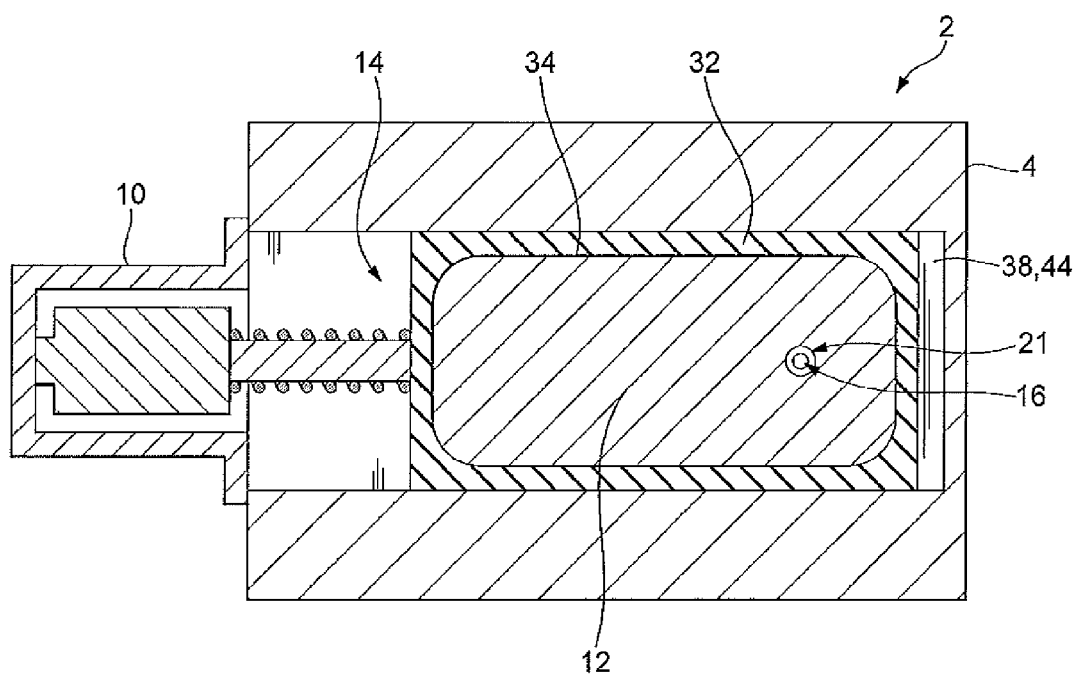
FIG. 4 is a cross section cross-sectional top plan view of the valve taken along section line 4-4 in FIG. 3, and showing a compliant seal on a peripheral edge of a sliding member in the valve.

Referring to FIGS. 2-4, a sliding member 12 is disposed in the main body 4. As a nonlimiting example, the sliding member 12 may be a thin plate disposed within a channel 14 that traverses the passage 6 of the main body 4. The sliding member 12 is movable between a closed position (shown in FIG. 2) and an open position (shown in FIGS. 3 and 4) by sliding along the channel 14. The sliding member 12 is rigid and substantially fluid impermeable. For example, the sliding member 12 may be metallic, polymeric, or composite, as desired. In one example, the plate forming the sliding member 12 is stainless steel. In particular embodiments, the sliding member 12 may have a thickness between about 1 mm and about 10 mm, and particularly between about 3 mm and about 5 mm. A skilled artisan may select a thickness and an ability of the sliding member 12 to withstand excessive deformation that is suitable for minimizing interference with the channel 14, and minimizing a volume available for moisture and ice buildup in volume 16, as desired.

The sliding member 12 has an orifice 16 formed therein. The orifice 16 may be drilled or otherwise formed through the sliding member 12. The walls surrounding the orifice 16 may alternatively be formed by an insert of a material different from a material of the sliding member 12, in order to optimize wear and friction characteristics of the walls surrounding the orifice 16. For example, the orifice 16 may be formed of a fluorocarbon and the sliding member 12 may be formed of stainless steel. Other materials may also be employed for the orifice 16 and the sliding member 12, as desired.

The orifice 16 permits the flow of the fluid therethrough when the sliding member 12 is in the open position. The orifice 16 may be offset to a side of the sliding member 12, for example, so that the orifice 16 is disposed adjacent one side of the passage 6. Where the orifice 16 is offset, it should be appreciated that a sliding distance for the sliding member 12 between the closed position and the open position may be minimized.

The valve 2 further includes at least one biased plug 18, 20 disposed within the main body 4 adjacent the sliding member 12. The biased plug 18, 20 abuts an outer surface 22, 24 of the sliding member 12 and seals the orifice 16 of the sliding member 12 and militates against a formation of ice in the orifice 16 when the sliding member 12 is in the closed position. In particular, the biased plug 18, 20 fills a physical volume of the orifice 16 when the sliding member 12 is in the closed position. The biased plug 18, 20 may fill an entirety of the physical volume of the orifice 16, or a portion of the physical volume of the orifice 16, as desired. The walls surrounding the orifice 16 may have a chamfered surface 21 that facilitates a movement of the biased plug 18, 20 from the orifice 16 when the sliding member 12 is moved to the open position, and which guides the biased plug 18, 20 into the orifice 16 when the sliding member 12 is moved to the closed position.

It should be understood that the passage 6 may have an opening 23 formed therein adjacent the at least one biased plug 18, 20. The opening 23 advantageously permits fluid flow through the orifice 16 when the sliding member 12 is in the open position. In combination with the offsetting of the orifice 16, the opening 23 may be employed to minimize the sliding distance for the sliding member 12 between the closed position and the open position. The opening 23 also widens the passage 6 to minimize surface tension and avoid capturing moisture and ice on the surface of the passage 6 adjacent the channel 14. The opening 23 thereby also minimizes an opportunity for trapping water between the sliding member 12 and the main body 4.

In particular embodiments, the at least one biased plug 18, 20 includes a first biased plug 18 and a second biased plug 20, and the outer surface 22, 24 includes a first outer surface 22 and a second outer surface 24. The first biased plug 18 and the second biased plug 20 may be disposed on opposite sides of the sliding member 12, for example. The first biased plug 18 may abut the first outer surface 22, and the second biased plug 20 may abut the second outer surface 24, when the sliding member 12 is in the open position. The first biased plug 18 also seals one side of the orifice 16 of the sliding member 12, and the second biased plug 20 also seals an other side of the orifice of the sliding member 12, when the sliding member 12 is in the closed position. Although a pair of the biased plugs 18, 20 is shown in FIGS. 2-5C, it should be understood that only a single biased plug 18, 20 may also be used within the scope of the present disclosure.

As shown in FIGS. 2-3, the at least one biased plug 18, 20 includes a plug body 26 and a spring 28. The plug body 26 is configured to sealingly engage walls surrounding the orifice 16 of the sliding member 12 when the sliding member 12 is in the closed position. The plug body 26 is biased toward the sliding member 12 by the spring 28. The spring 28 maintains a force that causes the plug body 26 to enter the orifice 16, while also permitting the plug body 26 to be removed from the orifice 16 as the sliding member 12 moves. In certain embodiments, the spring 28 is disposed within a bore 30 formed in the main body 4 adjacent the channel 14 and the sliding member 12. The spring 28 is shown as a coil spring in FIGS. 2-3. However, one of ordinary skill in the art may select other types of springs 28 such as helical springs, leaf springs, cantilever springs, elastomeric springs, and the like, as desired.

Figure 5A:
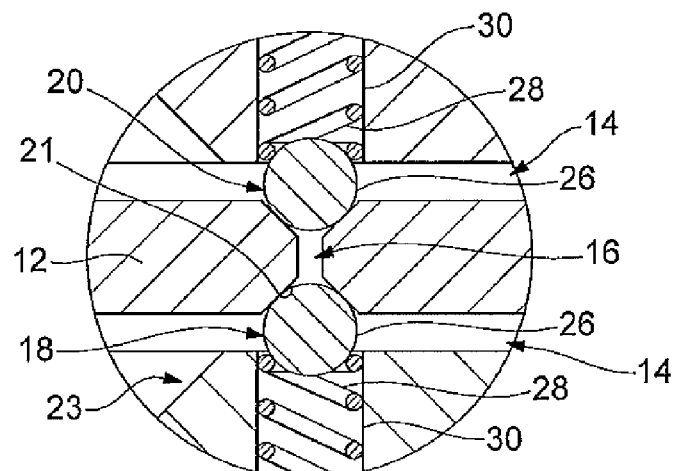
FIGS. 5A-5C are enlarged fragmentary side elevational views of the valve taken at callout 5 in FIG. 2, and showing a variety of shapes for a biased plug in the valve.
Figure 5B:
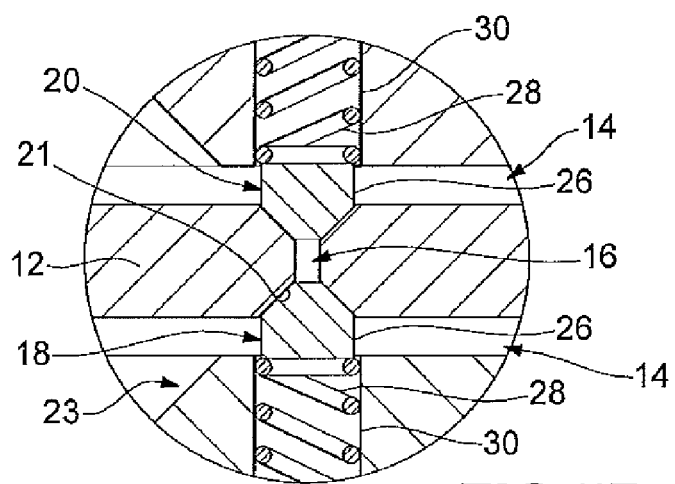
Figure 5C:
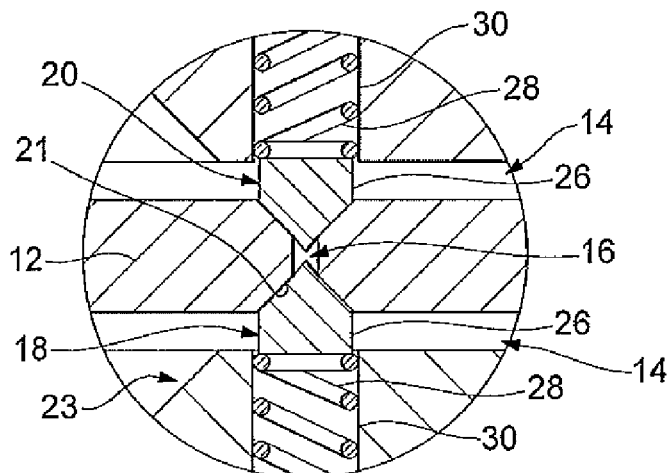

Referring to FIGS. 5A-5C, a shape of the plug body 26 may substantially conform to a shape of the orifice 16. For example, the plug body 26 may be formed from a flexible polymeric material such as rubber or the like. The plug body 26 may also be tapered. In certain examples, the plug body 26 may be one of substantially spherical (FIG. 5A), substantially frustoconical (FIG. 5B), and substantially conical (FIG. 5C) in shape. Where the plug body 26 is shaped to sealingly fit the shape of the walls of the orifice 16, the plug body 26 may be formed from a rigid material such as metal. Other shapes and materials for the plug body 26 that are suitable for sealing the orifice 16 when the sliding member 12 is in the closed position may be used within the scope of the present disclosure.

It should be appreciated that the first biased plug 18 in an alternative configuration may comprise the plug body 26 and diaphragm seal (not shown) that has an outer diameter greater than the orifice 16 and creates a positive seal due to the pressure differential between anode to cathode. The diaphragm seal may be in a configuration such that if the first biased plug 18 is molded from a polymer, a ring that would be larger than the orifice 16 opening would act as the diaphragm to create the seal. The diaphragm seal would be joined to the first biased plug 18 and create the positive seal against the outer surface 22 of the sliding member 12. A skilled artisan should understand that the diaphragm seal is only used on the high pressure side, and therefore not used for the second biased plug 20.

In alternative embodiments, the plug body 26 may be shaped to penetrate at least partially through the orifice 16 and break up any ice formation that may have occurred within the orifice 16 during a shutdown of the fuel cell system.

With renewed reference to FIGS. 2-4, as shown, the valve 2 includes a compliant seal 32. The compliant seal 32 may be formed from an elastomer that is compliant under low temperature operation conditions for a fuel cell vehicle, for example, down to a temperature of at least −30° C. Other suitable materials may also be employed.

The compliant seal 32 is disposed on and sealingly coupled to a peripheral edge 34 of the sliding member 12. The compliant seal 32 also has an end portion 38 that sealingly abuts and is coupled to the main body 4 to separate the passage 6 of the main body 4 into an inlet portion 40 and an outlet portion 42. A high pressure flow may be present on the inlet portion 40 of the passage 6 during an operation of the fuel cell system with the valve 2.

The end portion 38 of the compliant seal 32 may be bonded to surfaces of the channel 14 of the main body 4, for example, with an adhesive, ultrasonic welding, or the like. The end portion 38 may alternatively be mechanically secured to the main body 4. In a particular embodiment, the end portion 38 of the compliant seal 32 is substantially T-shaped in cross-section. Arms 44 of the T-shaped end portion 38 may be bonded or otherwise mechanically affixed to the surface of the channel 14. In another embodiment, the end portion 38 may have an accordion-like structure (not shown) that permits the compliant seal 32 to flex as the sealing member 12 is moved between the closed position and the open position. Other means for coupling the end portion 38 to the main body 4 may also be employed, as desired.

In certain embodiments, the end portion of the compliant seal 32 may be strained when the sliding member 12 is in the open position, and substantially non-strained when the sliding member 12 is in the closed position. Where the actuator 10 is coupled to the sliding member 12, and configured to move the sliding member 12 to the open position when activated, the compliant seal 32 may assist the solenoid in moving the sliding member 12 to the closed position when the actuator 10 has been deactivated.

Advantageously, the valve 2 of the present disclosure protects the orifice 16 from ice buildup by storing the orifice 16 in the protected main body 4 and plugging the orifice 16 with the seal body 26 when the valve 2 is in the closed position. The passage 6 through the valve 2 also has a relatively large surface area compared to the orifice 16, and thereby advantageously resists water and ice buildup due to surface tension.

While certain representative embodiments and details have been shown for purposes of illustrating the invention, it will be apparent to those skilled in the art that various changes may be made without departing from the scope of the disclosure, which is further described in the following appended claims.

The invention claimed is:

1. A valve for a fuel cell system, comprising:
   a main body having a passage through which a fluid is permitted to flow;
   a sliding member disposed in the main body and configured to move between an open position and a closed position, the sliding member having an orifice formed therein; and
   at least one biased plug disposed within the main body adjacent the sliding member, wherein the biased plug abuts an outer surface of the sliding member and fluid is permitted to flow through the orifice of the sliding member when the sliding member is in the open position, and wherein the biased plug seals the orifice of the sliding member and militates against a formation of ice in the orifice when the sliding member is in the closed position.

2. The valve according to claim 1, wherein the sliding member is a plate disposed in a channel of the main body.

3. The valve according to claim 2, further comprising a compliant seal disposed on and sealingly coupled to a peripheral edge of the plate.

4. The valve according to claim 3, wherein the compliant seal has an end portion coupled to the main body.

5. The valve according to claim 4, wherein the end portion of the compliant seal is bonded to the main body.

6. The valve according to claim 4, wherein the end portion of the compliant seal is substantially T-shaped in cross-section.

7. The valve according to claim 4, wherein the end portion of the compliant seal is strained when the sliding member is in the open position and substantially non-strained when the sliding member is in the closed position.

8. The valve according to claim 1, wherein walls surrounding the orifice have a chamfered surface.

9. The valve according to claim 1, wherein the orifice is offset to an end of the sliding member.

10. The valve according to claim 1, wherein the at least one biased plug includes a plug body and a spring.

11. The valve according to claim 10, wherein the spring of the biased plug is disposed in a bore formed in the main body.

12. The valve according to claim 10, wherein a shape of the plug body of the biased plug conforms to a shape the walls surrounding the orifice.

13. The valve according to claim 12, wherein the plug body of the biased plug is one of substantially spherical, substantially conical, and substantially frustoconical in shape.

14. The valve according to claim 10, wherein the plug body of the biased plug is one of metallic and polymeric.

15. The valve according to claim 10, wherein the spring is a coiled spring.

16. The valve according to claim 1, wherein the passage has an opening formed therein adjacent the at least one biased plug, the opening facilitating fluid flow through the orifice when the sliding member is in the open position.

17. The valve according to claim 1, further comprising an actuator operatively coupled to the sliding member for moving the sliding member between the open position and the closed position.

18. The valve according to claim 17, wherein the actuator is a solenoid.

19. A valve for a fuel cell system, comprising:
   a main body having a passage through which a fluid is permitted to flow;
   a sliding member disposed in the main body and configured to move between an open position and a closed position, the sliding member having an orifice formed therein; and a first biased plug disposed within the main body adjacent the sliding member, wherein the first biased plug abuts a first outer surface of the sliding member and fluid is permitted to flow through the orifice of the sliding member when the sliding member is in the open position, and wherein the first biased plug seals the orifice of the sliding member and militates against a formation of ice in the orifice when the sliding member is in the closed position; and a second biased plug disposed within the main body adjacent the sliding member, the second biased plug disposed opposite the first biased plug, wherein the second biased plug abuts a second outer surface of the sliding member and fluid is permitted to flow through the orifice of the sliding member when the sliding member is in the open position, and wherein the second biased plug seals the orifice of the sliding member and militates against a formation of ice in the orifice when the sliding member is in the closed position.

20. A fuel cell system, comprising:

a fuel cell stack having an inlet for one of a fuel and an oxidant; and a valve in fluid communication with the inlet of the fuel cell stack, the valve including a main body having a passage through which a fluid is permitted to flow, a sliding member disposed in the main body and configured to move between an open position and a closed position, the sliding member having an orifice formed therein, and at least one biased plug disposed within the main body adjacent the sliding member, wherein the biased plug abuts an outer surface of the sliding member and fluid is permitted to flow through the orifice of the sliding member when the sliding member is in the open position, and wherein the biased plug seals the orifice of the sliding member and militates against a formation of ice in the orifice when the sliding member is in the closed position.

* * * * *